E. E. GREEN.
COMBINATION LOCK.
APPLICATION FILED APR. 28, 1913.
1,091,744.
Patented Mar. 31, 1914.
2 SHEETS—SHEET 1.
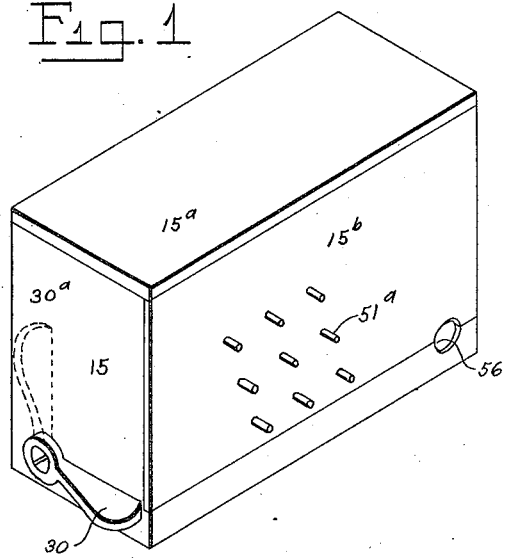
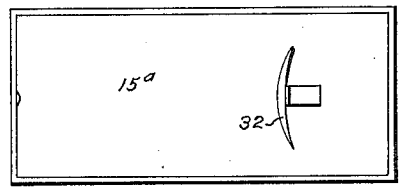
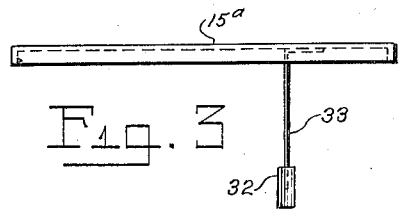
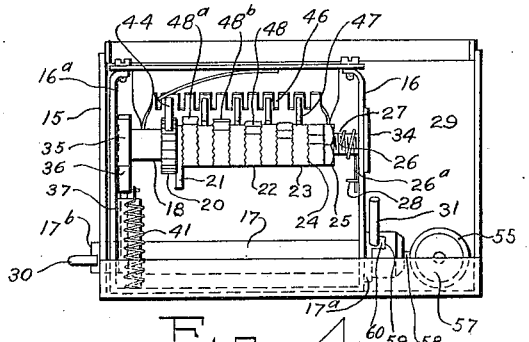
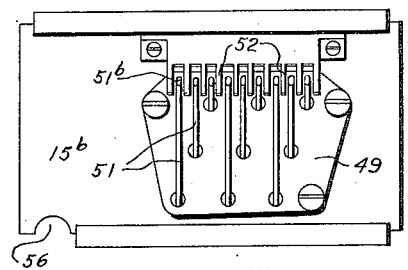
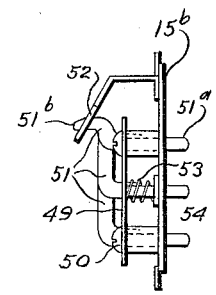
WITNESSES
Frank M. Warner
Ethel Westfall
INVENTOR
Ernest E. Green
BY
L. L. Westfall ATTORNEY
COLUMBIA PLANOGRAPH CO., WASHINGTON, D. C.

E. E. GREEN.
COMBINATION LOCK.
APPLICATION FILED APR. 28, 1913.

1,091,744.

Patented Mar. 31, 1914.

2 SHEETS—SHEET 2.

WITNESSES
Frank M. Horner
Ethel Westfall

INVENTOR
Ernest E. Green
BY
L. L. Westfall  ATTORNEY

UNITED STATES PATENT OFFICE.

ERNEST E. GREEN, OF SPOKANE, WASHINGTON.

COMBINATION-LOCK.

1,091,744.  Specification of Letters Patent.  Patented Mar. 31, 1914.

Application filed April 28, 1913. Serial No. 763,944.

*To all whom it may concern:*

Be it known that I, ERNEST E. GREEN, a citizen of the United States of America, residing at Spokane, in the county of Spokane and State of Washington, have invented certain new and useful Improvements in Combination-Locks, of which the following is a specification.

This invention pertains to locks and has for its object to provide a suitable lock of small dimension and simple construction and adapted for operation by a secret combination without the use of a key, such combination being subject to change by a re-adjustment of the parts.

In the accompanying drawings forming a part of this specification, and in which like numerals designate like parts throughout the several views, I have illustrated a practical application of my device, detail parts of which may be altered without varying from the inventive features which will be hereinafter described and pointed out in the claims.

Figure 8:
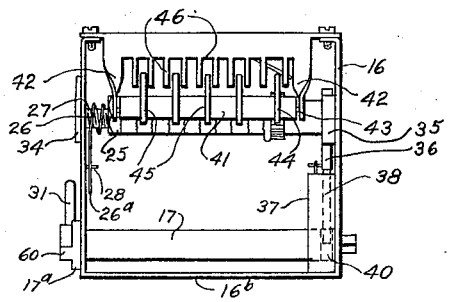
Figure 9:
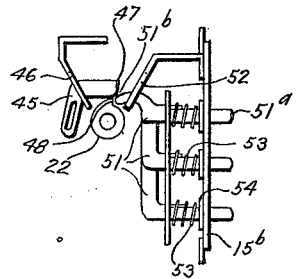
Figure 10:
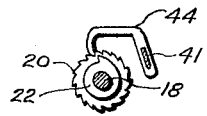
Figures 11, 15:
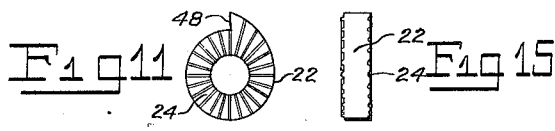
Figure 12:
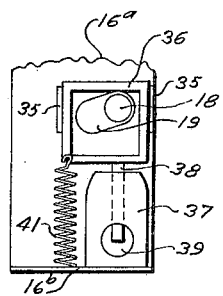
Figure 13:
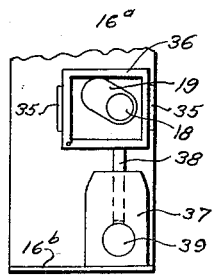
Figure 14:
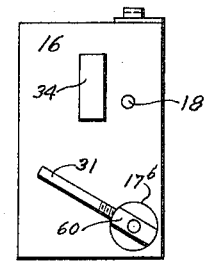

Figure 1, is a perspective view of the lock complete, Fig. 2, is a bottom view of the casing cover, removed from the remaining mechanism, Fig. 3, is an edge view of Fig. 2, Fig. 4, is a front view of the lock with the top and front covers removed including the mechanism attached to such top and front covers, Fig. 5, is a view of the inside of the front cover with the mechanism attached thereto, Fig. 6, is an end view of Fig. 5, Fig. 7, is a view of a pipe or tube connection containing a valve adapted for being operated by the lock, Fig. 8, is a rear view of an inner frame and the mechanism connected therewith, Fig. 9, is an end view of Fig. 5, showing in addition thereto the application of the keys to the tumblers, and to tripping bars, Fig. 10, is an end view of a shaft carrying the tumblers, and a ratchet wheel showing also a pawl engaging the ratchet wheel, Fig. 11, is a side view of one of the tumblers, Fig. 12, is a broken-away view of the inner side of the end of the casing and the mechanism attached thereto, with the locking pin in position for locking engagement with the bolt. Fig. 13, is a view of Fig. 12 with the locking pin out of locking engagement with the bolt and the coil spring removed. Fig. 14, is an end view of the inner frame, showing the mechanism secured thereto, and Fig. 15 is an end view of one of the tumblers.

An outer casing 15 has a removable cover 15$^a$ and a removable front 15$^b$. Within the outer casing 15 is secured an inner frame 16 (Fig. 4) transversely across which is arranged the bolt 17 and the shaft 18. The shaft 18 is journaled to the frame 16 and carries a cam 19 (Fig. 12), a ratchet wheel 20 and a plate 21 rigidly secured thereto and tumblers 22 and idler rings 23 loosely engaging the same. The plate 21, the tumblers 22 and the idler rings 23 are provided with serrated edges 24 adapted to engage each other. A bur 25 also engages the shaft 18 and is threaded thereto. A coil spring 26 has one end secured to the shaft 18, as at 27, encircles the shaft, and has its other end 26$^a$ retained by the pin 28 in the frame 16. The tumblers 22 and the idler rings 23 are made in effect rigid to the shaft 18 by their locking engagement between the plate 21 and the bur 25, but may be released and changed in relative location upon the shaft 18 by removing the shaft 18 from its position in the frame 16 then removing the spring 26 and the bur 25. This only needs to be done to change the combination of the lock as will be hereinafter explained. The bolt 17 extends through the end walls of the frame 16, one end thereof 17$^a$ extending into the cavity 29 and the other end 17$^b$ extending through the end wall of the casing 15 and has a knob 30 attached thereto. The bolt 17 when locked is in the position shown in Fig. 4, the knob 30 being horizontal and the pin 31 at the opposite end of the bolt and secured thereto being in nearly a vertical position. When the cover 15$^a$ is in its place, the catch 32 suspended from the same by the rod 33 engages a plate 34 and is held in that position by the pin 31. When the bolt 17 is released or unlocked and the same is turned, as will be hereinafter explained, to give effect or get results from the unlocked condition of the bolt, the knob 30 and the pin 31 change positions, the knob being nearly vertical 30$^a$ and the pin nearly horizontal. This change of position of the pin 31 releases the catch 32 so that the cover may be removed, if desired, but the cover can not be removed as long as the bolt 17 is locked.

Referring now to Figs. 12 and 13, it will be seen that to the end 16$^a$ of the frame 16, between the guides 35, and adapted for vertical movement, is a yoke 36. Attached to the bottom of the yoke 36 and extending downwardly through an opening in the plate 37 is a pin 38 which extends into the opening 39 in the wall 16ª through which the bolt 18 passes. The bolt 18 is provided with an opening 40 (Fig. 8) into which the pin 38 extends when the bolt is locked and which is the means of locking the same. A coil spring 41 is secured at one end to the bottom 16ᵇ of the frame 16 and at the other end to the yoke 36. The cam 19 on the shaft 18 occupies a position within the yoke 36. When the bolt 18 is locked, the yoke 36, the cam 19 and the pin 38 are in the positions shown in Fig. 12, and when the same is unlocked the said parts are in the positions shown in Fig. 13. Transversely arranged across the back of the frame 16 and nearly horizontal with the shaft 18 and adjacent thereto is a bar 41 (Fig. 8), journaled to the supports 42 as at 43. To the bar 41 is secured the pawl 44 adapted for engagement with the ratchet wheel 20. Slidably adjusted to the bar 41 are the rods 45, the same extending through the guide teeth 46 with their ends 47 extending over the idler wheels 23 (Fig. 4). On the periphery of the tumblers 22 are projections 48 (Fig. 11) and when these tumblers are adjusted to the shaft 18, they are arranged so that projections 48 occupy a different position on the shaft. For instance, the projection 48ª (Fig. 4) occupies a position at the upper side of the shaft, projection 48ᵇ a position a little farther forward, and so on. Suspended from the inner wall of the front plate 15ᵇ of the casing 15 (Fig. 6) a distance from the said front plate is a secondary plate 49, held in that position by the screws 50. Loosely adjusted through openings in the front plate 15ᵇ and the secondary plate 49 are keys 51 with one end 51ª projecting through the front plate 15ᵇ on the outside thereof and one end 51ᵇ passing through the guide teeth 52 and occupying a position directly in front of the projections 48 (Fig. 4) on the tumblers 22 and directly in front of the ends 47 of the rods 45. Coil springs 53 (Figs. 6 and 9) engage the keys 51 at positions between the front plate 15ᵇ and the secondary plate 49. Rings 54 are rigidly secured to the keys 51 also between the two plates 15ᵇ and 49 and serve to compress the springs 53 against the plate 49 when the keys 51 are pressed inwardly, consequently to return the keys to their normal positions when released, the normal positions being as shown in Figs. 6 and 9. When the keys 51 are pressed inwardly they will either strike the projections 48 on the tumblers 22 thereby rotating the shaft 18 a distance rearwardly or they will strike the ends 47 of the rods 45. When the shaft 18 is rotated rearwardly by the action above mentioned, the pawl 44 engaging the ratchet wheel 20 holds the shaft at the position to which it has been rotated, but if a key is pressed inwardly that strikes against the end 47 of one of the rods 45, on account of the rods 45 and the pawl 44 being secured to the same bar 41, the pawl 44 is elevated and the coil spring 26 rotates the shaft 18 back to the original position. In order to release the bolt 17 (Fig. 4) from its locked condition by means of the pin 38 occupying the opening 40 therein (Figs. 8 and 12) the shaft 18 must be rotated rearwardly a sufficient distance to cause the cam 19 attached thereto to elevate the yoke 36 to the position shown in Fig. 13 thereby clearing the bolt 17 of the pin 38, which is elevated out of the opening 40 (Fig. 8) in the shaft 17. In order to obtain this rotation of the bolt 17, at least three keys 51 adapted to bear against the projections 48 must be pressed in rotation and none of the keys bearing against the ends 47 of the rods 45 compressed, otherwise the work of rotation of the shaft 18 rearward is neutralized by the release and return thereof. Therefore the operator must have the combination or know what keys to press in order to release the bolt 17. The combination may be changed by changing the relative positions of the tumblers 22 and idler wheels 23 on the shaft 18 and shifting the rods 45 on the bar 41 to correspond with the changes made. The turning of the bolt 17 may be used to make or break an electric current through the lock or to change the arrangement of mechanical parts, for instance, for opening and closing a valve in a gasolene supply pipe on a gasolene driven automobile.

I have shown a section of a pipe or tube 55 reaching through an opening 56 in the casing 15 (Figs. 1, 4 and 7) having a valve 57, the stem 58 of which terminates in a groove 59 which engages a tenon 60 on the end 17ª of the bolt 17. It will thus be seen that the rotation of the bolt 17 one-fourth way around will completely open the valve 57 when closed or completely close the same when open.

What I claim is,

1. A combination lock comprising an outer casing, an inner frame, a bolt extending across the frame and adapted to be rotated, a knob on the outside of the outer casing connected with said bolt, a shaft extending across the inner frame carrying tumblers and idler rings loosely adjusted thereto, means for connecting said tumblers and idler rings in rigid relation to each other and with the shaft, projections on the tumblers, keys extending through the casing adapted for engaging the said projections to rotate the shaft, connecting means between the shaft and the bolt whereby by the predetermined rotation of the shaft, the bolt is unlocked to rotation by the manual operation of the knob and means for locking the bolt against rotation by the operation of said knob.

2. A combination lock comprising an outer casing, an inner frame, a bolt extending across the frame and adapted to be rotated, a knob on the outside of the outer casing connected with said bolt, a shaft extending across the inner frame carrying tumblers and idler rings loosely adjusted thereto, means for connecting said tumblers and idler rings in rigid relation to each other and to the shaft, projections on the tumblers, keys extending through the casing adapted for engagement with the said projections to rotate the shaft, a cam connected to the shaft, a yoke in which the cam operates, means reaching from the yoke to the bolt for locking the bolt against rotation, together with a spring attached to said yoke, by means of which the bolt is locked against rotation.

3. A combination lock comprising an outer casing having a removable cover, an inner frame, a bolt extending across the frame and adapted to be rotated, a knob on the outside of the casing connected with said bolt, means within the casing for locking the bolt against rotation and means within the casing for releasing said bolt to rotation, keys extending through said casing adapted to rotate said bolt and to be manually operated from without said casing, together with a catch suspended from the cover, a plate on the inner frame engaged by said catch and locked in such engagement by means of a pin extending from the bolt and engaging the catch.

In testimony whereof I affix my signature in presence of two witnesses.

ERNEST E. GREEN.

Witnesses:
GEO. E. CANFIELD,
WILLIAM H. KAYE.

Copies of this patent may be obtained for five cents each, by addressing the "Commissioner of Patents, Washington, D. C."